United States Patent [19]

Sheth

[11] Patent Number: 4,616,337
[45] Date of Patent: * Oct. 7, 1986

[54] AUTOMATIC READ SYSTEM FOR PERIPHERAL-CONTROLLER

[75] Inventor: Jayesh V. Sheth, El Toro, Calif.

[73] Assignee: Burroughs Corporation, Detroit, Mich.

[*] Notice: The portion of the term of this patent subsequent to Feb. 4, 2003 has been disclaimed.

[21] Appl. No.: 480,517

[22] Filed: Mar. 30, 1983

[51] Int. Cl.4 .............................................. G06F 3/00
[52] U.S. Cl. .................................................... 364/900
[58] Field of Search ... 364/200 MS File, 900 MS File

[56] References Cited

U.S. PATENT DOCUMENTS 4,280,193  7/1981  Baun et al. ........................ 364/900
4,423,480  12/1983  Bauer et al. ........................ 364/200
4,534,013  8/1985  Sheth .................................. 364/900

Primary Examiner—James R. Hoffman
Attorney, Agent, or Firm—Alfred W. Kozak; Nathan Cass; Kevin R. Peterson

[57] ABSTRACT

A peripheral-controller is used to manage data transfers between peripheral units of the magnetic tape type. A program sequencer in the peripheral-controller can signal an automatic read-write selection logic and control unit to operate in the "automatic read" mode whereby an automatic read-logic unit will transfer data out of the magnetic tape peripheral unit into a buffer memory of the peripheral-controller on a continuous basis without further instructions being required from the program sequencer.

7 Claims, 12 Drawing Figures

FIG. 2. (CFE CARD)

FIG. 3A (PDB CARD 1.)

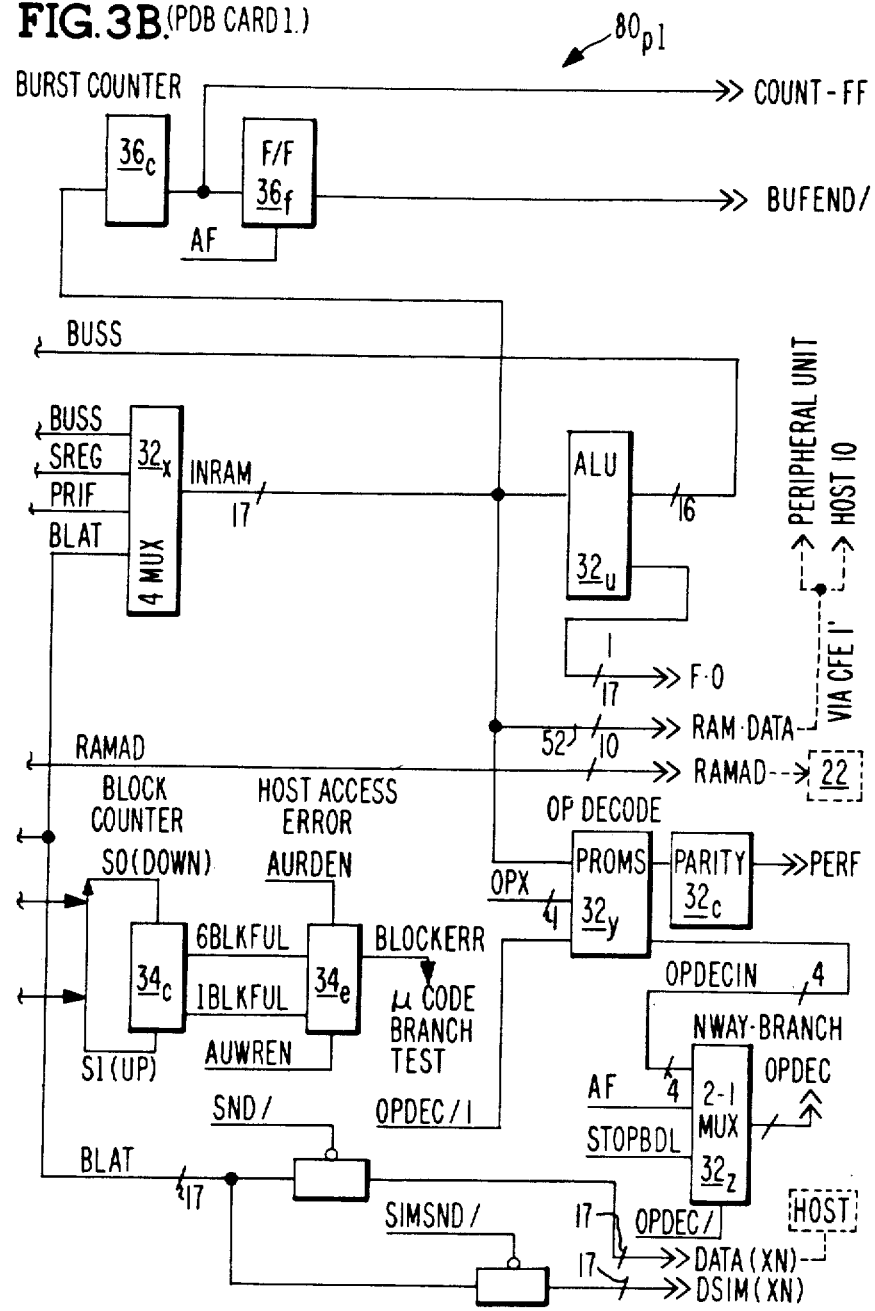
FIG.3B.(PDB CARD 1.)

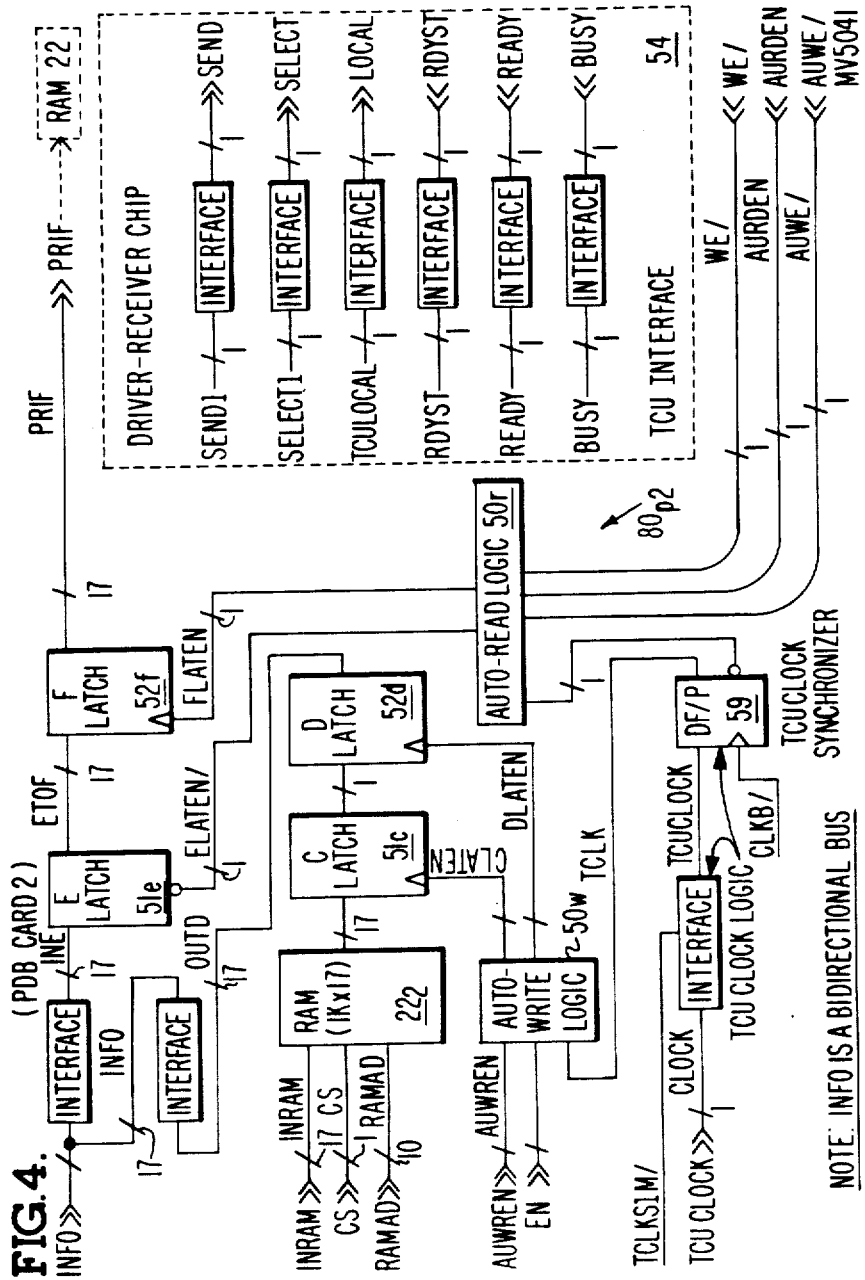

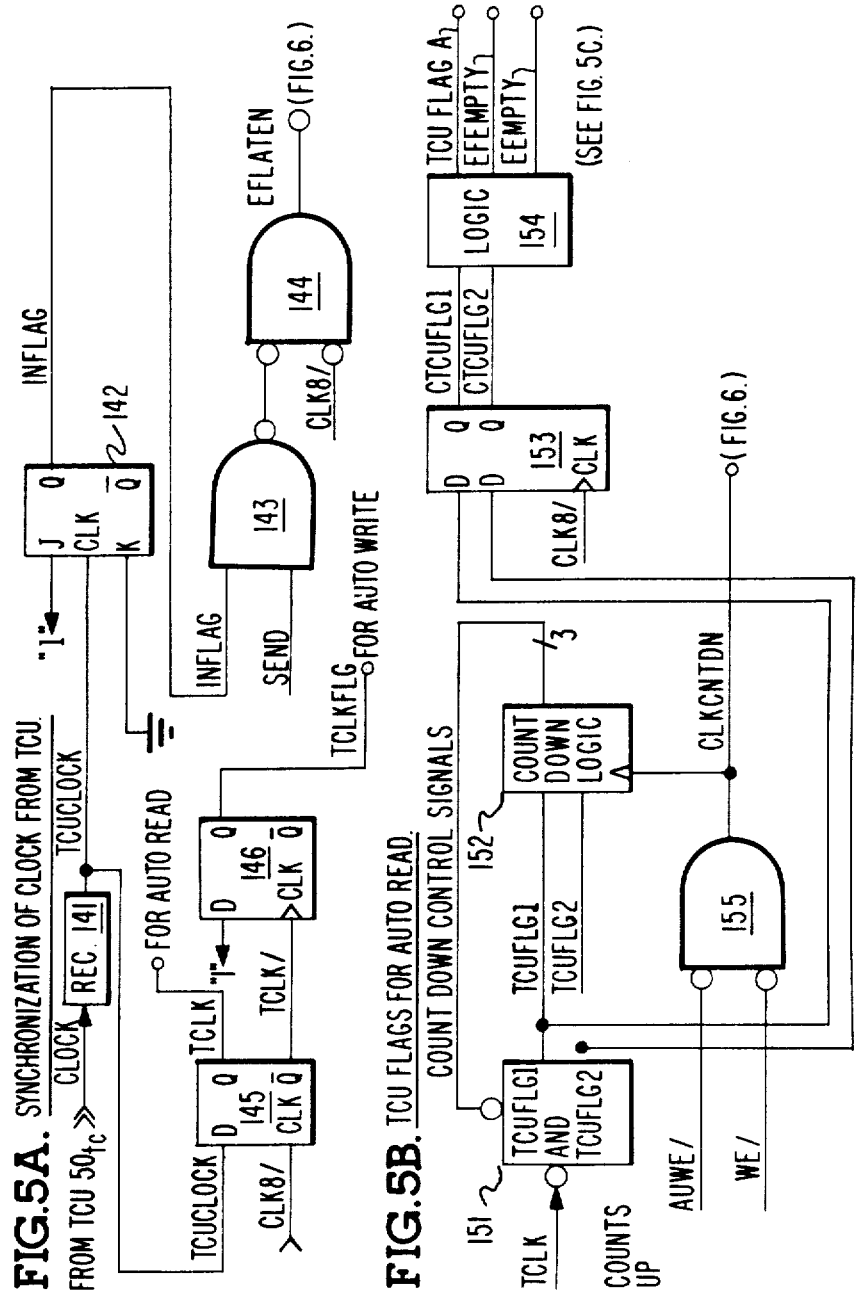

FROM FIG.5B.

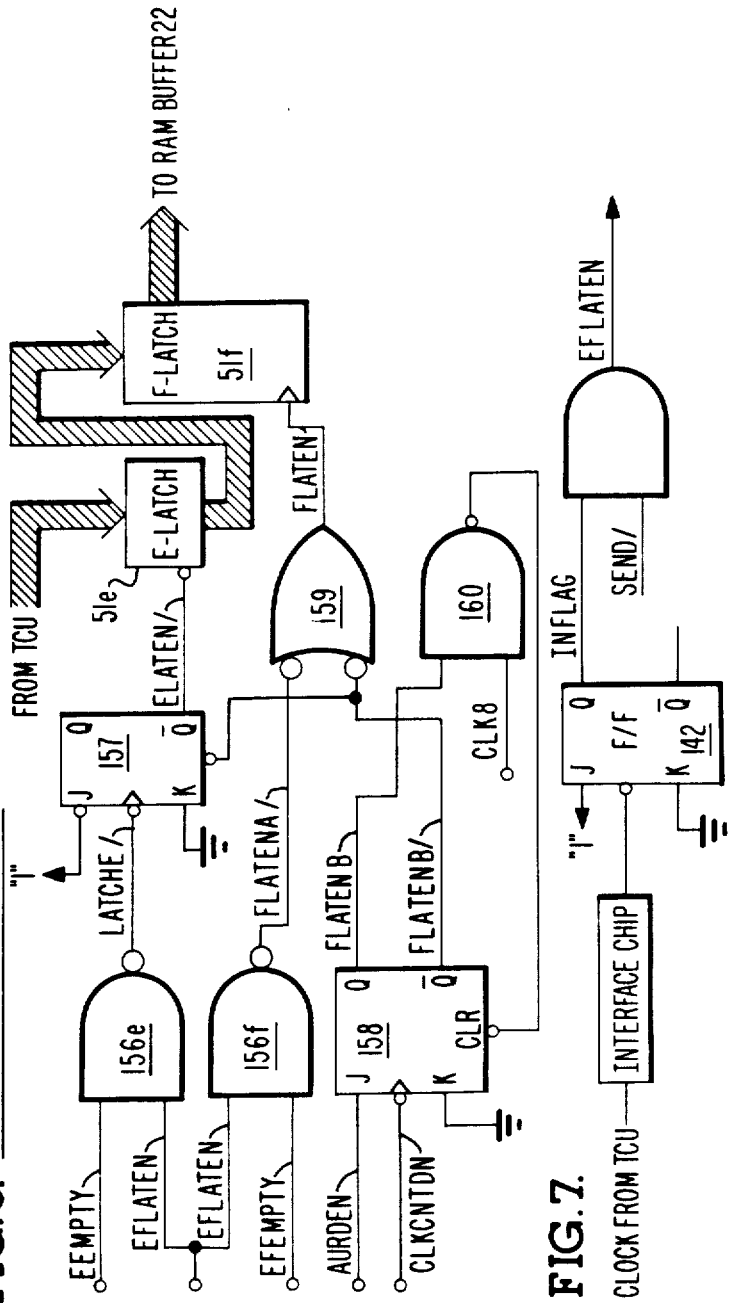

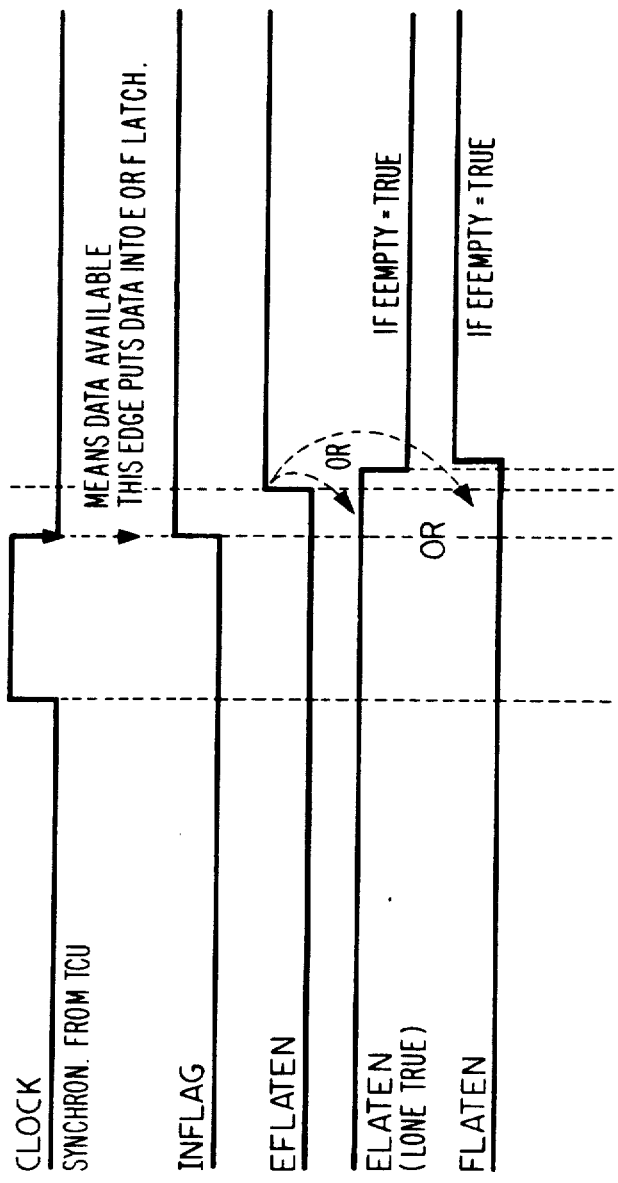

AUTOMATIC READ SYSTEM FOR PERIPHERAL-CONTROLLER

FIELD OF THE INVENTION

This invention is related to systems where data transfers are effectuated between magnetic tape peripheral terminal units and a main host computer wherein an intermediate I/O subsystem involving a peripheral-controller is used to perform the housekeeping duties of the data transfer.

BACKGROUND OF THE INVENTION

A continuing area of developing technology involves the transfer of data between a main host computer system and one or more peripheral terminal units. To this end, there has been developed I/O subsystems which are used to relieve the monitoring and housekeeping problems of the main host computer and to assume the burden of controlling a peripheral terminal unit and to monitor control of data transfer operations which occur between the peripheral terminal unit and the main host computer system.

A particular embodiment of such an I/O subsystem has been developed which uses peripheral controllers known as "data link processors" whereby initiating commands from the main host computer are forwarded to a peripheral-controller which manages the data transfer operations with one or more peripheral units. In these systems the main host computer also provides a "data link word" which identifies each task that has been initiated for the peripheral-controller. After the completion of a task, the peripheral-controller will notify the main host system with a result/descriptor word as to the completion, incompletion or problem involved in the particular task.

These types of peripheral-controllers have been described in a number of patents issued to the assignee of the present disclosure and these patents are included herein by reference as follows:

U.S. Pat. No. 4,106,092 issued Aug. 8, 1978, entitled "Interface System Providing Interfaces to Central Processing Unit and Modular Processor-Controllers for an Input-Output Subsystem", inventor D. A. Millers, II.

U.S. Pat. No. 4,074,352 issued Feb. 14, 1978, entitled "Modular Block Unit for Input-Output Subsystem", inventors D. J. Cook and D. A. Millers, II.

U.S. Pat. No. 4,162,520 issued July 24, 1979, entitled "Intelligent Input-Output Interface Control Unit for Input-Output Subsystem", inventors D. J. Cook and D. A. Millers, II.

U.S. Pat. No. 4,189,769 issued Feb. 19, 1980, entitled "Input-Output Subsystem for Digital Data Processing System", inventors D. J. Cook and D. A. Millers, II.

U.S. Pat. No. 4,280,193 issued July 21, 1981, entitled "Data Link Processor for Magnetic Tape Data Transfer System", inventors K. W. Baun and J. G. Saunders.

U.S. Pat. No. 4,313,162 issued Jan. 26, 1982, entitled "I/O Subsystem Using Data Link Processors", inventors K. W. Baun and D. A. Millers, II.

U.S. Pat. No. 4,322,792 issued Mar. 30, 1982, entitled "Common Front-End Control for a Peripheral Controller Connected to a Computer", inventor K. W. Baun.

The above patents, which are included herein by reference, provide a background understanding of the use of the type of peripheral-controllers known as "data link processors", DLP, used in a data transfer network between a main host computer and peripheral terminal unit.

In the above mentioned Baun patent, there was described a peripheral-controller which was built of modular components consisting of a common front end control circuit which was of a universal nature for all types of peripheral controllers and which was connected with a peripheral dependent board circuit. The peripheral dependent circuit was particularized to handle the idiosyncrasies of specific peripheral terminal units.

The present disclosure likewise uses a peripheral-controller (data link processor) which follows the general pattern of the above described system, in that the peripheral-controller uses a common control circuit or common front end which works in coordination with a peripheral dependent circuit which is particularly suited to handle a specific type of peripheral terminal unit, such as a Tape Control Unit (TCU) which connects to one or more magnetic tape peripheral units.

CROSS REFERENCES TO RELATED INVENTIONS

This disclosure relates to the following patent applications:

U.S. Ser. No. 509,796, filed June 30, 1983, by inventor Jayesh V. Sheth, for "Automatic Write System for Peripheral Controller", now U.S. Pat. No. 4,534,013.

"Block Counter System to Monitor Data Transfers", inventor J. V. Sheth, filed Nov. 16, 1982 as U.S. Ser. No. 442,159, now abandoned.

"System for Regulating Data Transfer Operations", inventors G. Hotchkin, J. V. Sheth and D. J. Mortensen, filed Dec. 7, 1982 as U.S. Ser. No. 447,389, and later abandoned and refiled as a continuation-in-part on Aug. 12, 1985 as U.S. Ser. No. 764,520.

"Burst Mode Data Block Transfer System", inventors J. V. Sheth and D. J. Mortensen, filed Jan. 11, 1983 as U.S. Ser. No. 457,178, now U.S. Pat. No. 4,542,457.

SUMMARY OF THE INVENTION

The present invention involves a data transfer network wherein a peripheral-controller known as a data link processor is used to manage and control data transfer operations between a peripheral such as a magnetic tape unit (via a tape control unit) and the main host computer system, whereby data is transferred rapidly in large blocks, such as a block of 256 words.

The data link processor provides a RAM buffer memory means for temporary storage of data being transferred between peripheral and host system. In this case, the RAM buffer is capable of holding at least six blocks or units of data, each of which consists of 256 words, each word being of 16 bits.

In particular, this disclosure is specifically directed to an automatic "read" system where data transfer, from the peripheral unit to the buffer memory, is set into an "automatic read" mode which enables rapid transfer without any further need of direction and control from the program sequencer of the peripheral-controller.

The "automatic read" operation is effectuated through an automatic read-logic circuit which controls the flow of data through two latch registers which pass data from the peripheral unit to the buffer memory.

Signals from the program sequencer in the common front end of the peripheral-controller are used to set a unit (designated as the automatic read-write selection logic and control unit) into the automatic read mode.

This unit activates the automatic read-logic circuit which combines the basic clock with signals from a synchronizing clock unit from the peripheral unit and operates the two latch registers for the transfer of data in the "Read" direction, i.e., taking of data from the magnetic tape peripheral unit and transferring it to the buffer memory for eventual transfer to the main host computer.

BRIEF DESCRIPTION OF THE DRAWINGS

FIG. 3 is composed of two sheets marked as FIGS. 3A and 3B.

FIG. 4 is a block diagram of the second circuit card of the peripheral dependent circuit of the peripheral-controller.

FIG. 5A is a circuit drawing of the circuit for synchronizing data transfer from the tape control unit to the peripheral-controller.

FIG. 5B is a logic circuit used for control of automatic Read operations for transferring data from magnetic tape units to the peripheral-controller.

FIG. 6 is a circuit diagram of the latching logic for the automatic Read circuit.

FIG. 7 is a diagram illustrating operation of the latch enable function of FIG. 5A.

FIG. 8 is a timing diagram showing use of the automatic Read and latching circuitry.

GENERAL SYSTEM OPERATION

Figure 1:
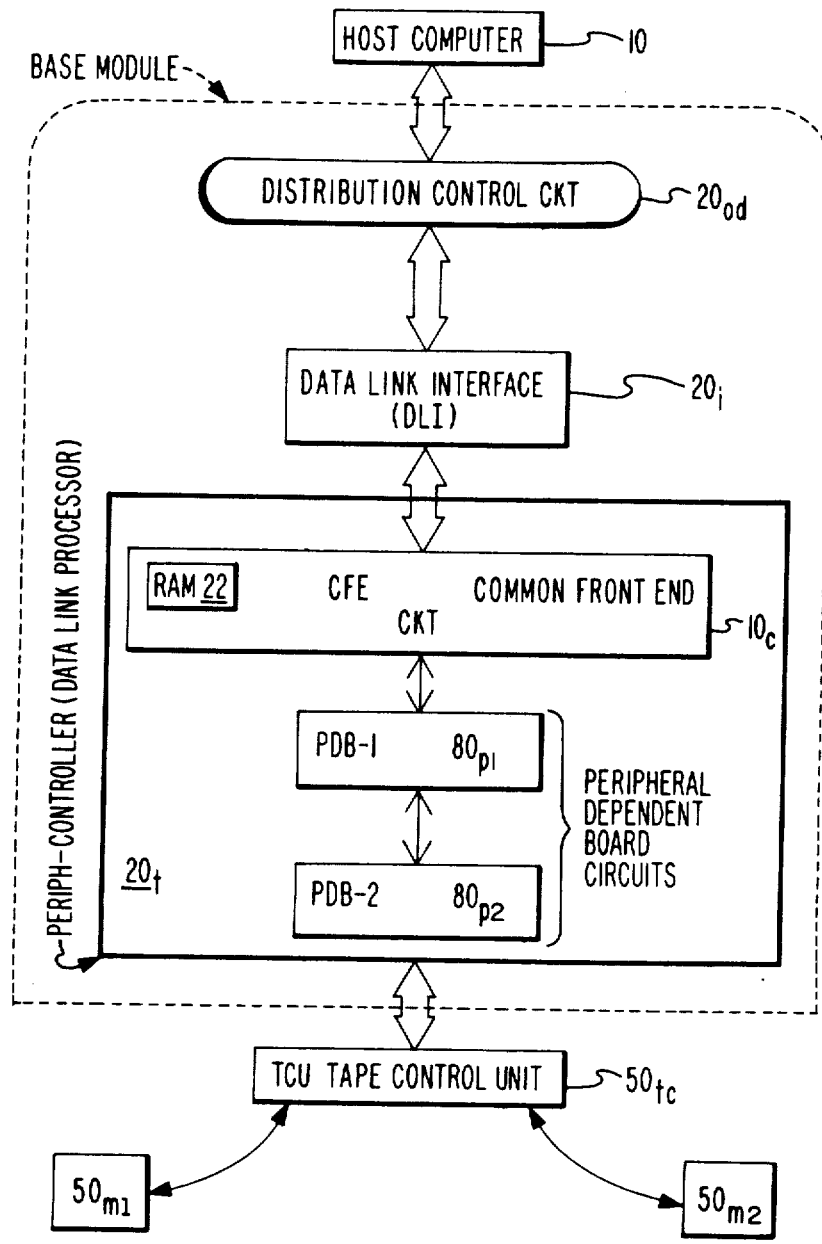
FIG. 1 is an overall system drawing of the elements involved in data transfer operations between host computer and magnetic tape peripheral terminals.

To initiate an operation, the host system 10, FIG. 1, sends the peripheral-controller (data link processor $20_t$) an I/O descriptor and also descriptor link words. The term "DLP" will be used to represent the Data Link Processor (peripheral-controller $20_t$). The I/O descriptor specifies the operation to be performed. The descriptor link contains path selection information and identifies the task to be performed, so that when a report is later sent back to the main host system 10, the main host system will be able to recognize what task was involved. After receipt of the I/O descriptor link, the data link processor (DLP) makes a transition to one of the following message level interface states.

(a) Result Descriptor: This state transition indicates that the data link processor $20_t$ is returning a result descriptor immediately without disconnection from the host computer 10. For example, this transition is used when the DLP detects an error in the I/O descriptor.

(b) DISCONNECT: This state transition indicates that the peripheral-controller $20_t$ which is designated as the Magnetic Tape-Data Link Processor (MT-DLP) cannot accept any more operations at this time and that the I/O descriptor and the descriptor link were received without errors. This state also indicates that data transfers or result descriptor transfers can occur.

(c) IDLE: This state transition indicates that the DLP $20_t$ can accept another legal I/O operation immediately and that the I/O descriptor and the descriptor link were received without errors.

When the operation is completed, the DLP $20_t$ returns a result descriptor indicating the status of the operation to the main host system. If the DLP detects a parity error on the I/O descriptor or the descriptor link, or if the DLP cannot recognize the I/O descriptor it received, then the DLP cannot proceed with execution of the operation. In this case, the DLP returns a one-word result descriptor to the host. In all other cases the DLP returns a two-word result descriptor.

The data link processor $20_t$ is a multiple-descriptor data link processor capable of queuing one I/O descriptor for each magnetic tape unit to which it is connected. There are certain descriptors (Test/Cancel; Test/Discontinue; and Test/ID) which are not queued, but which can be accepted at any time by the DLP. Test/Cancel and Test/Discontinue OPs are issued against a single magnetic tape unit in a queue dedicated to that peripheral unit, and require that an I/O descriptor for that particular magnetic tape unit already be present within the DLP. If an I/O descriptor is received and violates this rule, the DLP immediately returns a result descriptor to the host. This result descriptor indicates "descriptor error" and "incorrect state".

As previously discussed in the referenced patents, the MT-DLP utilizes the following status states (STC) transitions when "disconnected" from the host:

STC=3 to STC=1 IDLE to DISCONNECT indicates that the DLP is attempting to process a queued OP.

STC=1 to STC=3 DISCONNECT to IDLE indicates that the DLP is prepared to accept a new I/O descriptor.

STC=3 to STC=5 IDLE to SEND
DESCRIPTOR LINK indicates that the DLP is executing an OP, and that the DLP requires access to the host computer.

STC=1 to STC=5 DISCONNECT to SEND
DESCRIPTOR LINK indicates that the DLP is executing an OP, and that the DLP requires access to the host computer.

The DLP status states can be represented in a shorthand notation such as STC=n.

Upon completion of an I/O operation, the data link processor forms and sends the result descriptor to the host system. This descriptor contains information sent by the tape control unit $50_{tc}$ to the DLP in the result status word, and also information generated within the DLP. The result descriptor describes the results of the attempt to execute the operation desired.

DESCRIPTOR MANAGEMENT

All communications between the DLP $20_t$ and the host system 10 are controlled by standard DLP status states as described in the previously referenced patents. These status states enable information to be transferred in an orderly manner. When a host computer 10 connects to the DLP $20_t$, the DLP can be in one of two distinct states: (a) ready to receive a new descriptor, or (b) busy.

When in STC=3 (IDLE), the DLP can accept a new I/O descriptor. When in STC=1 (DISCONNECT) or in STC=5 (SEND DESCRIPTOR LINK), then the DLP is busy performing a previously transferred operation.

When the DLP receives an I/O descriptor and descriptor link that does not require immediate attention, the DLP stores the descriptor in its descriptor queue. The DLP is then able to receive another I/O descriptor from the host system.

When the host system 10 "Disconnects" from the DLP $20_t$ after issuing one or more queued I/O descriptors, then the DLP initiates a search of its descriptor queue. This search continues until the DLP finds an I/O descriptor that needs DLP attention, or until the host "reconnects" to send additional I/O descriptors. If the DLP finds an I/O descriptor that requires attention, and if the descriptor specifies neither a Test/Wait for Unit Available OP, nor a Test/Wait for Unit Not Available OP, then the DLP verifies that the host is still "disconnected". If these conditions are met, the DLP goes to STC=1 (DISCONNECT) and initiates execution of the descriptor. Once the DLP goes to STC=1, then no further I/O descriptors are accepted from the host until the initiated operation has been completed and a result descriptor has been returned to the host.

The DLP searches its descriptor queue on a rotational basis. The order for search is not disturbed by the receipt of one or more new I/O descriptors, nor by the execution of operations. This means that all queued entries are taken in turn regardless of DLP activity and all units have equal priority.

When cleared, the DLP halts all operations in progress with the peripherals and invalidates all the queued I/O descriptors, and returns to Status STC=3 (IDLE).

DLP-DATA BUFFERS AND DATA TRANSMISSION

The data buffer 22 (FIG. 1) of the DLP provides storage for six blocks of data which are used in a "cyclic" manner. Each of the six blocks holds a maximum of 512 bytes of data. Data is transferred to or transferred from the host system one block at a time, via the buffer 22, followed by a longitudinal parity word (LPW). Data is always transferred in full blocks (512 bytes) except for the final block of data for a particular operation. This last block can be less than the 512 bytes, as may be required by the particular operation.

Figure 2:
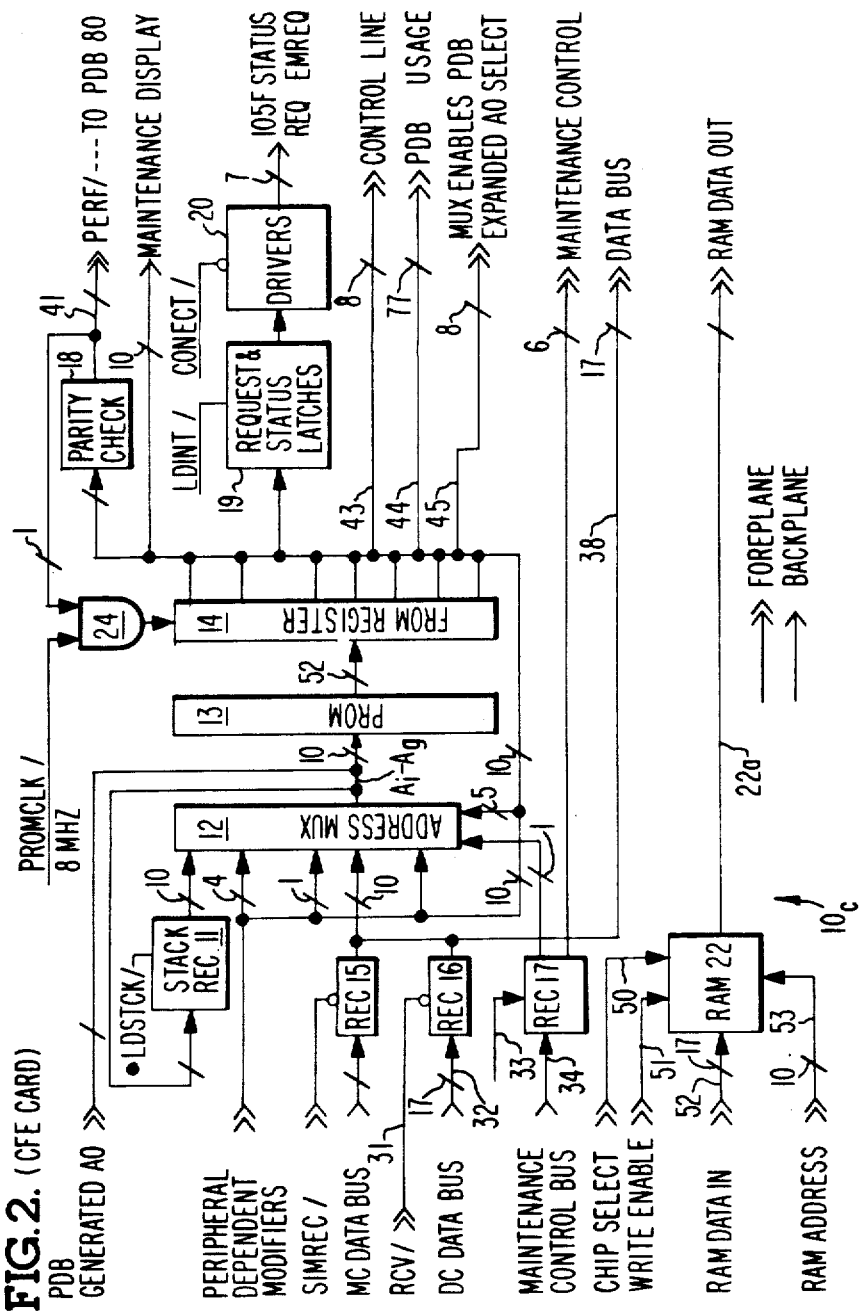
FIG. 2 is a block diagram of the common control circuit of the peripheral-controller, also called the common front end.
Figure 3:
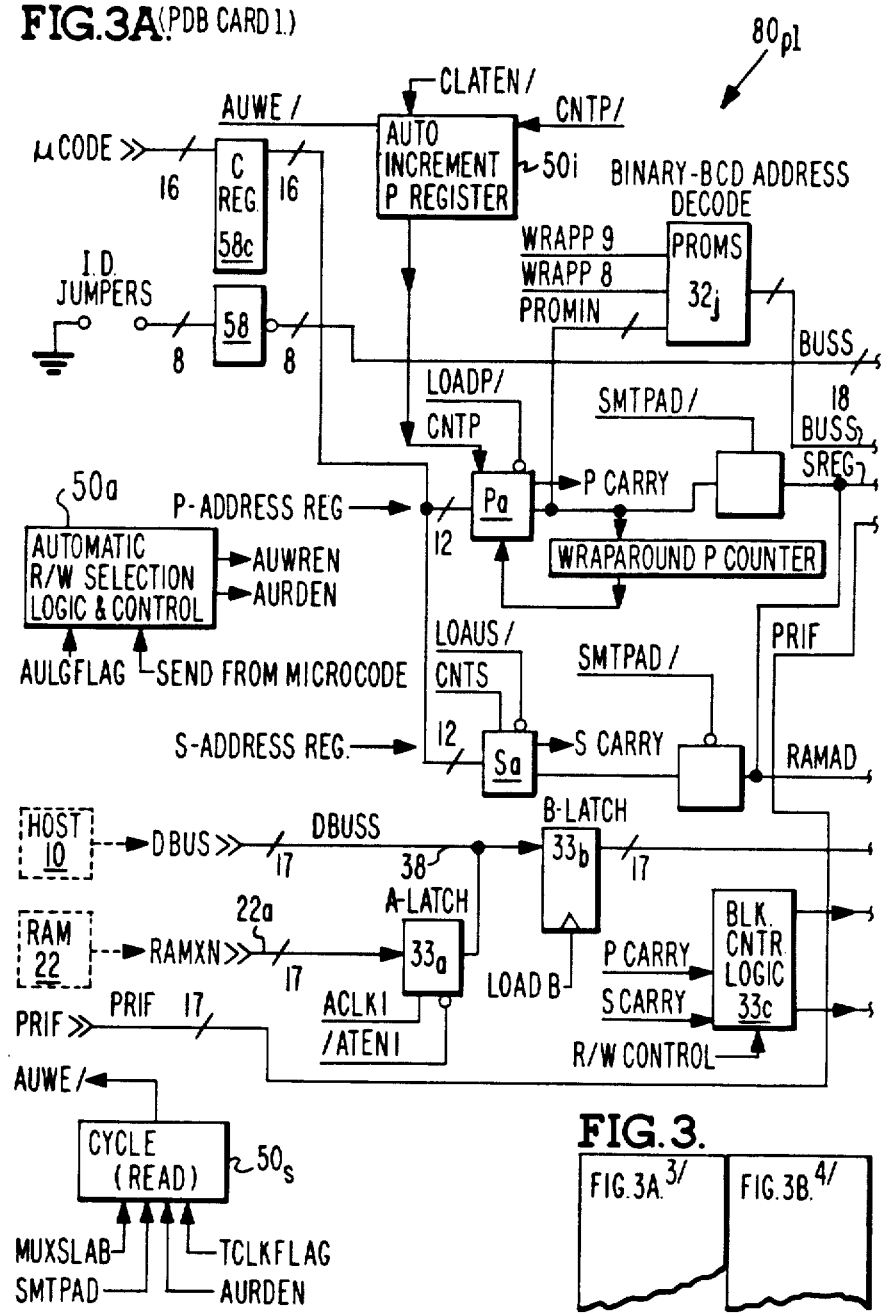
FIG. 3 is a block diagram of the first circuit card of the peripheral dependent circuit of the peripheral-controller.

As seen in FIG. 3, logic circuitry (to be described hereinafter) is used to feed information to a block counter $34_c$ which will register the number of blocks of data residing in buffer 22 at any given moment. When certain conditions occur, such as a full buffer, or empty buffer, or "n" number of blocks, the counter $34_c$ can set to trigger a flip-flop $34_e$ which will signal the common control circuit unit $10_c$ (FIG. 2) to start routines necessary to either transfer data to the host 10 (after reconnecting to the host) or to get data from the host 10 to transfer to the buffer 22 (seen in FIG. 1, and FIG. 2); or else the front end unit $10_c$, FIG. 2, can arrange to connect the DLP $20_t$ to the peripheral (as tape control unit $50_{tc}$) for receipt of data or for transmission of data.

During a Write operation, the block counter $34_c$ (FIG. 3) counts the number of blocks of data received from the host system 10. The data link processor "disconnects" from the host system once the DLP has received six buffers; or it will disconnect upon receipt of the "Terminate" command from the host system (a Terminate indicates the "end" of the Write data for that entire I/O operation). After disconnecting from the host, the data link processor connects to the peripheral tape control unit (TCU $50_{tc}$). Once proper connection is established between the data link processor and the tape subsystem, the data link processor activates logic which allows the tape control unit $50_{tc}$ a direct access to the DLP RAM buffer 22 for use in data transfers.

After the data link processor has transmitted one block of data to the tape control unit, the data link processor attempts to "reconnect" to the host system by means of a "poll request" (as long as the host 10 has not "terminated" the operation). Once this reconnection is established, the host transfers additional data to buffer 22 of the data link processor $20_t$, FIG. 1. This transfer continues until either the six blocks of RAM buffer memory 22 are again full (a buffer which is in the process of being transferred to the tape control unit is considered full during this procedure), or until the host 10 sends a "Terminate" command. Data transfer operations between the data link processor $20_t$ and the tape control unit $50_{tc}$ continue simultaneously with the host data transfers occurring between host 10 and DLP $20_t$ (via the buffer 22).

If the data link processor $20_t$ has not successfully reconnected to the host before the DLP has transmitted, for example, three blocks of data to the tape control unit $50_{tc}$, the data link processor sets "emergency request" on the data link interface $20_i$, FIG. 1. If the "emergency request" is not successfully serviced before the DLP has only one block of data remaining for transmission to the tape control unit, the data link processor sets a "Block Error" condition by signal from flip-flop $34_e$ to circuit $10_c$. This is reported to the host system as a "host access error" in the result descriptor.

The last block of data for any given I/O operation is transferred to the tape control unit $50_{tc}$ directly under micro-code control. During a "Read" operation, the data link processor first attempts to connect to the tape control unit $50_{tc}$. Once a successful connection is accomplished, the data link processor initiates logic to begin accepting data from the tape subsystem. Once the data link processor has received two blocks of data (or once the DLP receives all the data from the operation if the total length is less than two blocks), the data link processor attempts to connect to the host using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface $20_i$. If no connection to the host system is effectuated before all of the six RAM buffers are filled, then the data link processor sets "host access error" in the result descriptor.

Once the host system answers a "poll request", the data link processor $20_t$ starts to send data to the host system 10 (which data came from a peripheral magnetic tape unit) while at the same time continuing to receive data from the tape control unit $50_{tc}$. After the host 10, FIG. 1, has received one block of data, the data link processor checks whether or not two full blocks of data remain to be transferred to the host. If this is so, the DLP uses a "break enable". If a "break enable" request is granted, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates another "poll request" immediately after disconnection.

When the data link processor has completed data transfer, the tape control unit $50_{tc}$ enters the result phase and sends two words of result status to the data link processor $20_i$. The DLP then incorporates this information, plus any internal result flags, into the result descriptor which the DLP then sends to the host.

DESCRIPTION OF PREFERRED EMBODIMENT

Referring to FIG. 1, the overall system diagram is shown whereby a host computer 10 is connected through an I/O subsystem to a peripheral unit, here, for illustrative purposes, shown as a tape control unit $50_{tc}$. This tape control unit (TCU) is used to manage connection to a plurality of Magnetic Tape Unit (MTU) peripherals. As per previous descriptions in the above cited patents which were included by reference, the I/O subsystem may consist of a base module which supports one or more various types of peripheral-controllers, in addition to other connection and distribution circuitry such as the distribution control circuit $20_{od}$ and the data link interface $20_i$. The peripheral-controller $20_t$ is shown in modular form as being composed of a common front end circuit $10_c$ and a peripheral dependent circuit shown, in this case, as being composed of two peripheral dependent boards designated $80_{p1}$ and $80_{p2}$.

In this network situation, it is often desired that data from the main host computer be transferred on to a peripheral unit, such as a magnetic tape unit, for recording on tape. This would be done via a peripheral tape control unit TCU such as $50_{tc}$. Likewise, at times it is desired that data from the magnetic tape unit be passed through the tape control unit to be read out by the host computer. Thus, data is transferred in a bidirectional sense, that is, in two directions at various times in the activities of the network.

The key monitoring and control unit is the data link processor $20_t$ which when initiated by specific commands of the host computer will arrange for the transfer of the desired data in the desired direction.

The RAM buffer 22 (of FIGS. 1, 2) is used for temporary storage of data being transferred between peripherals and the main host computer. In the preferred embodiment this RAM buffer has the capability of storing at least six "blocks" of data, each block of which consists of 256 words.

The Magnetic Tape Data Link Processor (MT-DLP) consists of three standard 96-chip multi-layered printed circuit cards that plug into adjacent slots in the backplane of the base module (FIG. 1). The base module for this system has been previously described in U.S. Pat. No. 4,322,792 and the previously referenced patents.

The common front end card $10_c$ (FIGS. 1, 2) contains:
(a) The master control logic;
(b) $1K \times 17$-bit RAM words;
(c) $1K \times 49$-bit microcode PROM words which sequence and control the operation of the DLP;
(d) The interface receivers from the distribution card $20_{od}$ and from a maintenance card in the base module.

In addition to the common front end card $10_c$ there are two PDBs or peripheral dependent boards. These are designated PDB/1 and PDB/2 and are shown on FIGS. 3 and 4. These PDBs provide control signals and the interface to the magnetic tape subsystem.

The PDB/1 card contains:

(a) The System and Peripheral RAM Address Registers;
(b) The Binary-BCD Address Decode PROMs;
(c) Op Decode PROMs;
(d) N-Way Microcode Branch Logic;
(e) Burst Counter;
(f) Block Counter;
(g) Host Access Error Logic;
(h) Arithmetic Logic Unit (ALU).

The second peripheral dependent board card designated PDB/2 contains the following:
(a) The Auto Read Logic;
(b) Auto-Write Logic;
(c) Input (Read) and Output (Write) Latches;
(d) A $1K \times 17$-bit RAM buffer extension of the Common Front End RAM 22;
(e) Clock Logic for the Tape Control Unit $50_{tc}$;
(f) Interface Logic for the Tape Control Unit $50_{tc}$.

As discussed in the previously referenced patents, each card in the peripheral-controller (Data Link Processor) has "foreplane" connectors through which frontplane cables can interconnect these cards. The cards are slide-in cards which connect at the backplane connectors into the base module. The top two foreplane connectors of all three cards of the DLP are interconnected by means of three-connector, 50-pin foreplane jumper cables. The common front end is connected to the first board, PDB/1, via connector and cable and the board PDB/1 is connected to the second board, PDB/2, via another connector and cable. This is done by means of two-connector, 50-pin foreplane jumper cables. From the connector on the second board PDB/2, there is a 50-conductor cable which is connected to an interface card which plugs into an interface panel board. Connections to the tape subsystem TCU $50_{tc}$ is made from this interface panel board.

COMMON FRONT END CARD (CFE $10_c$)

In FIG. 2 there is seen a basic block diagram of the common front end card which has previously been described in U.S. Pat. No. 4,322,792 entitled "Common Front End Control for a Peripheral Controller Connected to a Computer", inventor Kenneth W. Baun. The most significant item of the common front end card designated as $10_c$ in FIG. 2 is the PROM 13 which is a $1K \times 52$-bit word memory. Only 49 (including odd parity bits) of the 52 bits are used. The last three bits are not used or checked for parity.

PROM 13 consists of 13 PROM chips of $1K \times 4$-bit chips which are connected in parallel to form the $1K \times 52$-bit PROM. The contents of these PROMs 13 are called the microcode which controls all of the DLP functions. The microcode address lines, designated A0–A9, are wired in parallel to all 13 chips. The eight megahertz clock (PROMCLK/) latches the next 52-bit microcode word output from the PROM 13 into the microcode register 14.

The common front end card $10_c$ contains logic which generates the address for the microcode PROMs. Also, certain component terms in this logic are further generated on the peripheral dependent boards. The CFE $10_c$ has a stack register 11 composed of three binary counter chips. This register contains the value of the current PROM address or the subroutine return address for a stacked branch operation.

Seventeen $1K \times 1$-bit RAM chips are connected in parallel to make up the random access buffer memory 22 on the common front end card $10_c$. This RAM 22 is made of 1K×17-bits. The Write Enable, the Chip Select, and the 10 RAM address lines are generated on the first PDB card $80_{p1}$, FIG. 1, and these address lines are routed in parallel to all of the RAM chips on the CFE $10_c$.

An additional 1K×17-bit RAM buffer memory $22_2$ is provided on the PDB/2 card $80_{p2}$, FIG. 1. Thus, the RAM buffer memory is 2K words deep. The same Write Enable, Chip Select and RAM address lines that feed the RAM 22 also feed the RAM $22_2$ on the second board PDB/2. A "low" signal chip select is used to select the RAM 22.

The "high" chip select signal selects the extended buffer RAM $22_2$ on PDB/2. All the data inputs and data outputs to the RAM buffer memories are sourced, sunk and controlled by the peripheral dependent boards PDB/1 and PDB/2.

The common front end $10_c$ also contains much of the logic for the hostward DLP interfaces. The "interface" to the distribution card $20_{od}$ and a path selection module is called the Data Link Interface (DLI) shown as $20_i$ on FIG. 1. The common front end $10_c$ contains the drivers and receivers for the control line on the DLI. The common front end card also contains the receivers for the bi-directional DLI data bus (DATAxx/O). The drivers and the directional controls for this particular bus are located on the first PDB card PDB/1.

The common front end card contains the receivers and control logic which enables connection to a maintenance card in the base module, and which governs test diagnostics for the data link processor. The CFE $10_c$ also contains the receivers for the 17-bit bi-directional data simulation bus (DSIMxx/O). This bus provides both data simulation and microcode PROM address override when used in the "maintenance mode". The drivers for this bus are located on the PDB/1 card. The CFE $10_c$ also contain some of the maintenance display logic used in DLP diagnostic routines.

The maintenance interface line (SWH.1/.0) is used to override the microcode PROM address. When the DLP is connected to the maintenance card, and when this line is "low", the DSIMxx/0 lines provide the microcode addresses. This permits the verification of the contents of the microcode, and also allows special microcode words to be used to govern DLP action during diagnostics.

PERIPHERAL DEPENDENT CIRCUITRY

The primary function of the peripheral dependent boards PDB/1, PDB/2 is to provide the interface to the peripheral tape subsystem which is controlled by tape control unit $50_{tc}$, FIG. 1. FIG. 3 is a functional block diagram of the first PDB card designated PDB/1. FIG. 3 shows the first PDB card containing addressing lines, data path lines and data path control for the DLP RAM 22 (FIG. 2) and $22_2$ (FIG. 4), the arithmetic logic unit $32_u$ (ALU) for the DLP, in addition to longitudinal and vertical parity generation and checking logic, microcode branching and control decode logic, peripheral data block counting and a binary-BCD converter.

Two twelve-bit address registers $P_a$ and $S_a$ are used to store RAM addresses. The system address register ($S_a$) is used when the MT-DLP is communicating with the host 10, and the peripheral address register ($P_a$) is used when the data link processor is communicating with the tape control unit, TCU $50_{tc}$. Ten-bits are needed to address the RAM (22 or $22_2$). Bit number 9 is the RAM chip select. When this bit is low, the RAM on the common front end card $10_c$ is addressed (RAM 22). When the chip select line is "high", the RAM $22_2$ on the second PDB card PDB/2 is addressed. Bit 10 of the address register provides function control. Both of these registers are addressed by the common front end microcode through the constant register designated C-register, $58_c$, FIG. 3.

The arithmetic logic unit $32_u$ (ALU), FIG. 3, is comprised of four 4-bit bi-polar-bit-slice microprocessors cascaded to form one 16-bit processor. The ALU contains sixteen 16-bit internal registers which can be loaded by the CFE microcode (from $10_c$) for both arithmetic and Boolean operations. Nine bits of microcode are used to control the ALU $32_u$.

The ALU $32_u$ receives input data from a 4×1 multiplexor $32_x$ (MUX). The same multiplexor $32_x$ also forms the data input 52 to the DLP RAM buffer 22 on the line labelled RAM-DATA of FIG. 3.

The data path on the PDB/1 card of FIG. 3 consists of two latches, $33_a$ and $33_b$. The A-latch $33_a$ of FIG. 3 receives the RAM buffer 22 output data. The B-latch $33_b$ receives data from the A-latch, from the common front end DLI receivers or else from the common front end DSIM bus receivers. B-latch receives these inputs on line 38 of FIG. 3. The B-latch outputs are fed to the 4×1 multiplexor $32_x$ and then to the ALU $32_u$ or else to the RAM buffer 22, or to the DLI data bus (DATAxx/0), or to the MI data simulation bus (DSIMxx/0). The drivers for these last two interfaces are located on the first PDB card designated PDB/1.

The block counter $34_c$ of FIG. 3 keeps track of the number of data blocks available for transfer or for acceptance with the host system and with the tape subsystem, $50_{tc}$.

BURST MODE

The MT-DLP has capabilities of utilizing a burst mode data transfer mode wherein data can be transferred to the host system at the maximum DLI rate of 64 megabits per second (depending upon the speed capability of the host system). When in the burst mode, the 8-bit burst counter $36_c$, FIG. 3, maintains a count of the number of words remaining to be transferred between the host and the data link processor during the burst transfer cycle.

A converter $32_p$, FIG. 3, designated Binary-to-BCD converter which uses binary address decode logic, converts binary data from the host system into binary-coded-decimal (BCD) data for use of the peripheral tape subsystem.

FIG. 4 shows a block diagram of the second peripheral dependent board designated PDB/2. This card contains an extension RAM $22_2$ of the RAM memory 22 (which is located on the CFE card $10_c$) The RAM memory extension on the second PDB card is designated as $22_2$ and contains a 1K×17-bit memory area. Particularly significant on the card PDB/2 is the logic designated as the Auto Read Logic $50_r$ and the Auto Write Logic $50_w$. In addition, the second peripheral dependent board card includes input latches $51_e$ and $51_c$ and output latches $52_f$ and $52_d$. A clock-strobe (proportional to tape speed) signal from peripheral $50_{tc}$ (TCU clock) feeds to a peripheral synchronizing clock circuit 59 for the peripheral subsystem (PRIF), and to the interface 54 (driver-receiver) which connects to the tape control unit TCU $50_{tc}$. This interface 54 contains drivers and receivers for the various control signal lines between the PDB/2 card and the tape control unit $50_{tc}$.

The extended RAM memory $22_2$ on PDB/2 (FIG. 4) is a 1K×17-bit memory which uses the same address lines and the same "write enable" as the common front end RAM buffer memory 22. A "high" chip select signal selects the extended RAM $22_2$, as previously discussed.

Unique to the magnetic tape data link processor is the logic known as the auto-write and auto-read logic ($50_w$, $50_r$). After being initialized and enabled, this logic is capable of transferring data to or from the tape control unit independently from any further microcode control from the CFE $10_c$. Thus, the MT-Data Link Processor can "simultaneously" transfer data on both the Data Link Interface $20_i$ with the host 10 and at the same time, transfer data on the peripheral interface with the tape control unit.

During a "Write" operation, the block counter $34_c$ (FIG. 3) counts the number of blocks of data received from the host system 10. The data link processor disconnects from the host system once the DLP has received six buffers; or upon receipt of the "Terminate" command from the host system (a "terminate" indicates the end of the Write data for that entire I/O operation). After disconnecting from the host, the data link processor $20_t$, FIG. 1, connects to the peripheral tape control unit $50_{tc}$. Once proper connection is established between the data link processor and the tape subsystem, the data link processor activates the Auto-Write logic. This allows the tape control unit a direct access to the DLP RAM buffer 22 or $22_2$ for use in data transfer to $50_{tc}$.

After the data link processor has transmitted one block (256 words) of data to the tape control unit, the data link processor attempts to "re-connect" to the host system by means of a "poll request". Once this re-connection is established, the host transfers additional data to the buffer 22 of the data link processor. This transfer continues until either the six blocks of RAM buffer memory are again full (a buffer which is in the process of being transferred to the tape control unit is considered full during this procedure), or until the host sends a "terminate" command. Data transfer between the data link processor and the tape control unit $50_{tc}$ continues simultaneously with the host data transfers to buffer 22. Thus, while the DLP $20_t$ is re-establishing the connection with the host system 10, the Auto Write Logic $50_w$ is transferring data from the buffer memory 22 over to the tape control unit $50_{tc}$.

If the MT-data link processor has not successfully reconnected to the host before the DLP has transmitted three blocks of data to the tape control unit, the data link processor sets "emergency request" on the data link interface $20_i$ (DLI). If the "emergency request" is not successfully serviced before the DLP buffer 22 has only one block of data remaining for transmission to the tape control unit, the data link processor sets a "Block Error" condition via $34_c$ of FIG. 3. This is reported to the host system as a "host access error" in the result descriptor.

The last remaining block of data for any given I/O operation is transferred to the tape control unit $50_{tc}$ directly under microcode control of the common front end $10_c$. This is called a "demand mode" rather than the previously described "burst mode". Here the Auto-Write logic is not used for transfer of the last data block. During a "Read" operation, the MT-data link processor first attempts to connect to the tape control unit $50_{tc}$. Once a successful connection is accomplished, the data link processor initiates the "Auto-Read Logic" $50_r$, and begins accepting data from the tape subsystem. Once the data link processor buffer 22 has received two blocks of data (or once the DLP receives all the data from the operation if the total length is less than 2-blocks) the data link processor attempts to connect to the host 10 using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface (DLI). If no connection to the host system is effectuated before all of the six RAM buffers are filled, then the data link processor sets "host access error" in the result descriptor. This means that the peripheral data has "over filled" the buffer 22 before the host 10 could manage to remove or sufficiently clear the data in the buffer 22.

Once the host system answers a "poll request", the data link processor $20_t$ starts to send data to the host system while at the same time, continuing to receive data from the tape control unit $50_{tc}$ under control of the Auto-Read Logic $50_r$. Thus, on a read operation, while the buffer 22 is being "emptied" of data by transfer to host system 10, it is concurrently being "filled" by operation of the Auto Read Logic $50_r$ which is transferring data from the peripheral tape unit to buffer 22. After the host 10 has received one block of data, the data link processor checks whether or not two full blocks of data remain to be transferred to the host. If this is so, the DLP uses a "break enable". If a break enable request is granted by the host, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates a "poll request" immediately after disconnection.

In the normal situation when there are more than two blocks of data to be transferred to the host system, the DLP sets the "burst counter" $36_c$ to 256 (words) and sends blocks of data to the host in the burst mode. When there are less than two blocks of data remaining to complete the I/O operation, the DLP calculates the actual length of the remaining data by comparing the P-register and S-register. The data link processor determines whether the remaining number of bytes is "odd" or is "even". If odd, the final byte is the PAD byte (all zeros inserted by the DLP). The final two blocks, whether partial or full, are sent to the host using a "demand" mode on a word by word transfer basis where the processor in $10_c$ will instruct each word transfer individually rather than automatically as in the burst mode.

When the data link processor has completed data transfer, the tape control unit enters a "Result Phase" and sends two words of result status to the data link processor. The DLP then incorporates this information, plus any internal result flags, into the result descriptor which the DLP $20_t$ then sends to the host 10.

Referring to FIG. 3, a block counter logic unit $33_c$ is used to receive input from two address registers designated as the peripheral address register, $P_a$, and the system address register, $S_a$. The peripheral address register, $P_a$, handles addresses required when data is retrieved from the peripheral tape unit or when data is being sent to the peripheral tape unit. The system address register, $S_a$, is used when data is being received from the host system into the buffer 22 or when data is being sent to the host system from the buffer 22. These two address registers in FIG. 3 are seen to receive their address data via microcode signals from the common front end circuit $10_c$ of FIG. 1.

The address data outputs from $P_a$ and $S_a$ are fed to the RAM buffer 22 in order to address the desired location in the buffer memory. Further, the block counter logic unit $33_c$ (FIG. 3) receives one input designated "P Carry" from the peripheral address register and another input "S Carry" from the system address register, in addition to a Read/Write control signal from read-write flip-flop $33_f$. The flip-flop $33_f$ is controlled by microcode signals from the control lines 43 (FIG. 2) of peripheral-controller common front end unit $10_c$. The block counter logic unit $33_c$, FIG. 3, provides two output signals designated $S_1$ and $S_0$ which are fed to the block counter $34_c$ where the output signals $S_1$ and $S_0$ are combined at certain times on occurrence of rising clock signals in order to provide conditions which will make the block counter either "shift up" or "shift down" or "no shift".

The block counter $34_c$ will reflect the situation that when data is being taken out of the magnetic tape unit in order to be fed to RAM buffer 22 ("Read" operation), the block counter will shift up unless at the same time there is data being removed from buffer 22 for transfer to the main host computer system in which case the block counter $34_c$ will shift down. Thus, the condition of the block counter's numerical status will indicate the "balance" between what data has gone out of and what data has come into the RAM buffer 22.

Referring to FIG. 3, if there is a "Write" operation, this determines that data is to be "written" into the magnetic tape unit. Then, as data is removed from the RAM buffer 22 over to the magnetic tape unit, the block counter $34_c$ will shift down but if more data is transferred from the main host computer into the RAM buffer 22, the block counter will be shifted up. Thus, again the placement of "ones" in various bit positions of $34_c$ provides a running balance of the data blocks taken out as against the data blocks taken in at any given period.

The condition known as the "host access error" causes the setting of a flip-flop $34_e$, FIG. 3. (This is also called a block counter error). Thus, on a Read operation, a full RAM buffer (six blocks of data) will signal an error condition indicating the buffer 22 was over filled beyond its capacity. Likewise, on a Write operation a single (one) remaining block of data will trigger an error condition.

During "Read" operations:
(a) As the P Carry increases (data being transferred from peripheral tape to buffer memory 22), the block counter $34_c$ will "shift up" indicating the buffer is being "loaded".
(b) As the S Carry increases (data from buffer memory being transferred to main host system), the block counter $34_c$ will "shift down" indicating the buffer memory is being "emptied".

During "Write" operations:
(c) As S Carry increases (data being loaded in buffer memory from main host system), the block counter $34_c$ will "shift up" to indicate the number of blocks of data in the buffer.

(d) As P Carry increases (data in buffer being unloaded for transfer to peripheral tape unit), the block counter $34_c$ will "shift down" and show how much data is left remaining in buffer 22.

During "Read" operations, when a "1" appears in the 6th bit position of block counter $34_c$, then a flip-flop circuit $34_e$ (FIG. 3) is "set" and provides a signal to the common front end circuit $10_c$ which will inform the main system of an "access-error" condition. This signifies that the buffer memory 22 was "overfilled" in that the main host system 10 did not accept data quickly enough.

During "Write" operations, when the buffer memory 22 has received six blocks of data from the host system, and the 1st bit position (1 BLKFUL) becomes "0", this indicates that the buffer memory has been completely unloaded (cleared) and then the flip-flop $34_e$ is "set" to signal the common front end circuit $10_c$ that more data is required from the host 10. This indicates the host did not supply data quickly enough to the RAM buffer 22.

Thus, the Data Link Processor $20_t$ provides a system for the control of data transfers which is sensitive to the condition of the data-in-transit residing in a RAM buffer memory and by which it is possible to monitor blocks of data being transferred between peripheral units and a main host computer when there are simultaneous flows of data being put into or taken out of the RAM buffer means.

AUTOMATIC READ SYSTEM FOR MAGNETIC TAPE-PERIPHERAL CONTROLLER

Referring to FIG. 3, there is again seen a block diagram of the main elements of the peripheral dependent card PDB/1 which is used in the magnetic tape peripheral-controller.

In addition to individual word data transfer operations, the system operates to permit automatic transfers of data blocks without need for repeated instruction routines. Thus, the microcode from common control circuit $10_c$ (FIGS. 1, 2) can set Read/Write Selection Logic $50_a$ (FIG. 3) for either Auto Read or Auto Write enabling signals (AURDEN, AUWREN).

For data transfers between the magnetic tape peripherals (via tape control unit $50_{tc}$) and buffer memory 22, the Auto Increment Register $50_i$ is used to increment the Peripheral Address Register, $P_a$.

The Cycle Steal unit $50_s$ (FIG. 3) is used to sense when the peripheral-controller $20_t$ is not connected to the Host 10 and is not otherwise busy, so that those available cycle times may be provided for Auto Read or Auto Write operations.

In FIGS. 4, 5A, the TCU clock synchronizer 59 receives signals from the tape control unit (TCU) clock-strobe shown as TCU CLOCK input to synchronizer 59. These clock-strobe signals (TCUCLOCK) are proportional to tape speed in a connected tape unit and are asynchronous in nature in relation to the basic clock. The synchronizer 59 also receives an eight-megahertz clock signal designated CLK8/ and acts to convert the asynchronous tape speed signal into a synchronous type signal, TCLK, FIGS. 4, 5A.

The TCU clock synchronizer 59 is used during "Read" operations whereby data from a selected magnetic tape unit is sent via the tape control unit TCU $50_{tc}$ over to the main host system 10 by means of the data link processor (peripheral-controller) $20_t$. The TCU clock signal is generated within the TCU $50_{tc}$ (tape control unit) by means of an asynchronous clock generator which is proportional to the speed of the particular tape unit being used. This is an asynchronous signal which can vary at any period of time according to the speed of the tape being read from.

In FIG. 4 the automatic read logic $50_r$ receives the coordination and clocking signal TCLK/ from the clock synchronizer 59 in order to synchronously regulate the timing of data transfers from the magnetic tape $50_{tc}$ over to the RAM buffer 22 of peripheral-controller $20_t$. This is done on an "automatic basis" which is regulated by the clock synchronizer 59.

The purpose of the clock synchronizer 59 is to regulate and synchronously clock the sequence of data which is read-out from the magnetic tape peripheral unit for transfer over to the RAM buffer 22 via the latches $51_e$ and $51_f$ of FIGS. 4 and 6.

Thus, the clock signals (TCU) from the tape control unit $50_{tc}$ are combined with basic 8-megahertz clocking signals in order to regulate the transfer of data on an synchronously automatic basis from the magnetic tape peripheral unit to the buffer 22 of the peripheral-controller even though the peripheral tape data is emitted at different speed rates.

In FIG. 4 the bi-directional line INFO (at the top left of this drawing) connects to the peripheral tape control unit $50_{tc}$ while the bus PRIF at the upper right-hand side of FIG. 4 connects to the 4-1 multiplexor $32_x$, FIG. 3, which feeds to the RAM buffer 22. This will also be seen in FIG. 6 where the F-latch $51_f$ is seen to have an output bus which provides output connection to the RAM buffer 22.

Referring to FIG. 4, which shows the PDB card 2, the top portion of the drawing indicates a data channel from the tape control unit TCU $50_{tc}$ connected to the line INFO which passes through the interface into the E latch $51_e$ and the F latch $52_f$ and thence a bus PRIF (which designates peripheral data from TCU over to the buffer 22) and whereby the bus PRIF connects eventually as an input data line to the RAM buffer 22 (after having passed through the multiplexor $32_x$ of FIG. 3).

Thus, during READ operations of the system there is a rapid and automatic flow of data from the tape control unit $50_{tc}$ over to the bus PRIF and thence to the RAM buffer 22.

This data transfer can take place on a simple byte by byte basis whereby the program sequencer of the common front end $10_c$ can convey a byte according to individual instructions or in a more efficient and rapid way known as the automatic read operation. The automatic read operation works to unburden any program sequences from the common front end $10_c$ and to completely take over the rapid transfer of data from a tape control unit into the RAM buffer 22. This is accomplished by the automatic read-logic circuit $50_r$ of FIG. 4 which is seen to control the two data latches designated as the E latch $51_e$ and the F latch $52_f$. The automatic read-logic $50_r$ can operate the E latch and the F latch in synchronism with signals from the TCU clock synchronizer 59 in order to move a large number of bytes of data without need for accessing any program sequences from the common front end $10_c$. Buffers E and F ($51_e$, $52_f$, FIGS. 4 and 6) effectively give the atuo read logic $50_r$ more time to transfer (via two buffer latches) data words from the tape units over to the buffer memory 22 since the Auto Read Logic $50_r$ operates on a "cycle steal" system, seen in FIG. 3. Thus, there is provided more tolerance for the Auto Read Logic not to have to always steal a cycle on every other clock. Thus, with the "dual latch" system shown in FIG. 6, the Auto Read Logic $50_r$ may sometimes only be required to have a "cycle steal" but once in six clocks while still keeping the transfer flow of data-words intact and uninterrupted.

Now referring to FIG. 3 there is seen the automatic read-write selection logic and control unit $50_a$. This unit is activated by two input lines designated AULGFLAG and the input SEND. The signal AULGFLAG is the $\overline{Q}$ output of the Auto-Logic Flag Flip-Flop which flip-flop is activated by the program instructions from the common front end $10_c$. A "low" output from the flip-flip enables the Automatic Read or the Automatic Write logic operations to take place. The SEND signal is a signal from the common front end microcode which indicates whether a "read" or a "write" operation is taking place. A "low" output indicates that the peripheral controller (data link processor) is sending data to the tape control unit on a "write" operation. A "high" signal here indicates that the peripheral controller is accepting and receiving data from the tape control unit peripheral on a "read" operation.

In the case of an automatic read operation, the SEND signal is at a "high" level to indicate a "read" operation where the data link processor is accepting data from the tape control unit.

The output of the automatic selection logic and control $50_a$ in this case results in activation of the automatic read enable output line designated AURDEN which output line is fed to the input of the automatic read logic circuitry $50_r$ of FIG. 4.

Thus, in FIG. 4 the automatic read-logic $50_r$ receives the Read Enable signal AURDEN from logic $50_a$. Further, the auto read logic $50_r$ receives the clocking signal TCLK shown in FIG. 5A. This signal is the tape control unit clock signal synchronized by the basic eight megahertz clock CLK/8. A further input to the automatic read-logic $50_r$ is a signal WE/. This is the Write Enable signal which allows data to be written into the RAM buffer 22. This signal comes from the signal designated #WE which is the microcode output of the common front end CFE $10_c$. A "high" #WE indicates that the microcode is ordering a "write" into the buffer 22, here the buffer being enabled by the state of the chip select signal CS/ which selects either RAM 22 or else RAM $22_2$.

The other input signal line to auto read logic $50_r$ is the signal AUWE/. This is the Auto Logic Write Enable signal which when "low" provides a Write Enable to permit data to be written into the RAM buffer 22 (or $22_2$) as required by the automatic logic operations.

The automatic read logic $50_r$ of FIG. 4 has now been activated by the appropriate input signals just discussed and as a result it can now operate automatically in order to transfer data from the tape control unit to the RAM buffer 22 by means of controlling the data transfer operations through the E latch and the F latch.

The first output signal of the automatic read logic $50_r$ is designated ELATEN/. This represents a high-low transition which loads data from the peripheral unit into the E latch $51_e$. The second output line of auto read logic $50_r$ is designated FLATEN/. This signal regulates the transfer of data from the E latch into the F latch and out of the F latch into the bus PRIF. The F latch signal operates on a high-low transition which moves data from the E latch $51_e$ into the F latch $52_f$ after moving data out of the F latch onto the bus PRIF.

Referring to FIG. 5A, there is shown the clock synchronizer 59 in greater detail. As seen in FIG. 5A, the TCU clock signal is conveyed from the tape control unit TCU $50_{tc}$ and provides an input to receiver 141. The output of this receiver is fed to a JK flip-flop 142 and also to a D flip-flop 145. The Q output of JK 142 provides a signal INFLAG which is fed to a NAND gate 143 which has a second input designated SEND/. The SEND/ signal is provided from the common front end circuit $10_c$. The output of gate 143 is fed to gate 144 which has a second input CLK8/. The output of gate 144 provides the signal EFLATEN which is the latch enable signal for the latches shown in FIG. 6.

The output of receiver 141 in FIG. 5A is designated TCU clock and is fed to the D flip-flop 145 which has a second input CLK8/. The Q output of the D flip-flop 145 provides the TCLK signal for "Automatic Read". The $\overline{Q}$ output provides a TCLK/ signal which feeds to a D flip-flop 146 to provide the TCLKFLG signal which is used for "Automatic Write" operations.

In FIG. 5B there is shown the use and development of flag signals from the tape control unit $50_{tc}$ which are used for Automatic Read operations. As seen in FIG. 5B, a signal TCLK provides input to a 2-bit counter 151 which is used to count up. This counting up is used to signify the number of clocks and hence the number of words which are being read out of the magnetic tape unit and the tape control unit. The output of the 2-bit counter 151 is fed to a count-down logic circuit 152 which provides a control signal output which feeds back to counter 151 in order to count-down. The count-down logic of 152 is used for other operations such as "Write" operations when it is necessary to count in reverse direction to quantify the number of words which are being "written" into a tape control unit rather than being taken out of it. The count-down logic 152 is provided with a signal from the output of a NAND gate 155 having inputs reflective of "Write Enable" and for automatic Write Enable, AUWE/, which derive from FIG. 3. The output of NAND gate 155 is the signal CLKCNTDN which is the clock count-down signal.

The two output lines of counter 151 are designated TCU FLG1 and FLG2. These lines are conveyed over to D flip-flop 153 which also has an 8-megahertz clock input. The outputs of D flip-flop 153 are designated CTCU flag 1 and flag 2. These are signals which are delayed one clock time over the signals TCU flag 1 and flag 2. The logic unit 154 receives the two CTCU flag signals (flag 1 and flag 2) and provides three output lines, designated TCUFLG, EFEMPTY and EEMPTY.

Figure 5C:
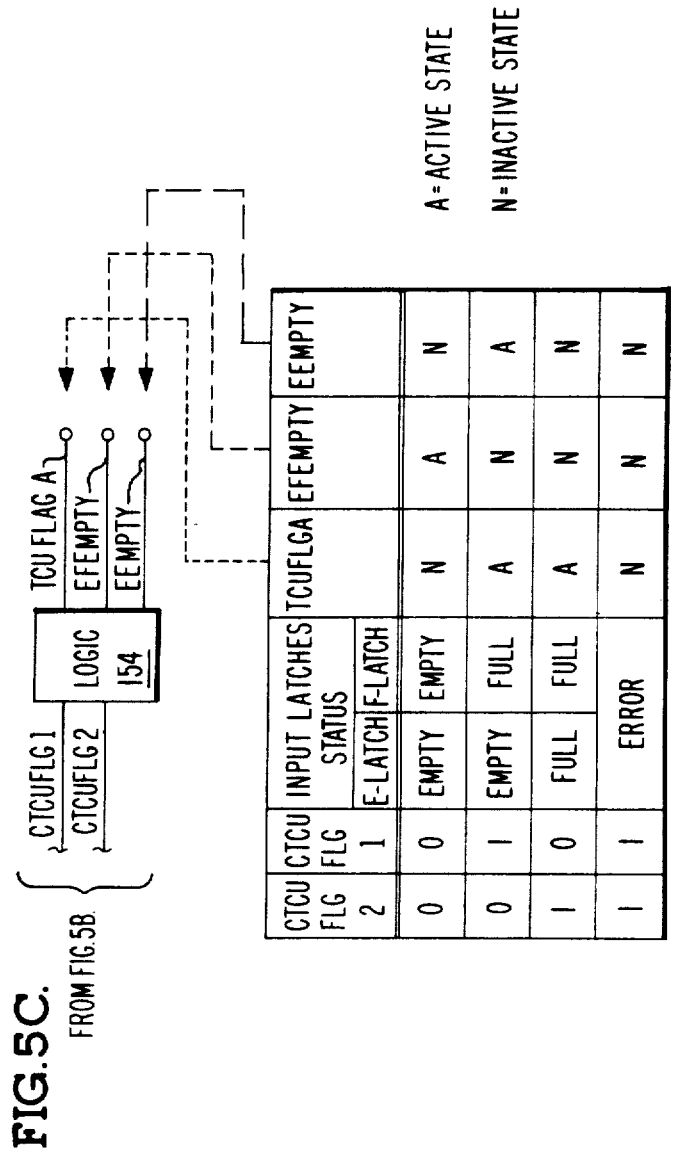
FIG. 5C is a chart illustrating operation of the automatic Read logic circuit.

These output signals of the logic unit 154 are tabularly shown in FIG. 5C as reflective of certain conditions that occur with respect to the word latches E and F ($51_e$, $51_f$) of FIGS. 4 and 6.

Referring to FIG. 6, there is shown the latching logic for Automatic Read operations in the magnetic tape peripheral-controller. Here in FIG. 6 it will be seen that the signal EFLATEN (E-latch, F-latch enable) are derived from the output of NAND gate 144 of FIG. 5A. This signal feeds to both NAND gates $156_e$ and $156_f$ of FIG. 6. The NAND gate $156_e$ has an input EEMPTY which is shown derived in FIG. 5B in logic unit 154, while the input signal to $156_f$ is EFEMPTY which is derived from logic unit 154 of FIG. 5B.

The output of $156_e$ (FIG. 6) is conveyed to JK flip-flop 157 where the $\overline{Q}$ output is used to regulate the E-latch $51_e$. The latch $51_e$ receives words from the TCU $50_{tc}$ as shown in FIG. 6. Thus, one word at a time is latched into the E-latch and then transferred to the F-latch $51_f$ but this can occur only if those latches have been emptied of their previous contents as shown in FIG. 5C.

The output of NAND gate $156_f$, FIG. 6, is fed to NAND gate 159. The other input to gate 159 comes from a JK flip-flop 158 in which JK 158 has inputs from the Automatic Read enable signal AURDEN and from the clock count-down signal. The Q output of flip-flop 158 is fed to a NAND gate 160 which feeds back a clear signal to the JK flip-flop 158.

It will be noted that NAND gate 159 provides the latch enable signal to the F-latch $51_f$ whereby the F-latch may then take a word and convey it to the RAM buffer 22 of the peripheral-controller. This RAM buffer 22, as previously noted, is located on the common front end card CFE $10_c$ (FIG. 2 and its extension on FIG. 4 as RAM $22_2$).

Thus, the combination effect of the latch enable signals to the E-latch and to the F-latch is to permit a word to be latched into the E-latch and then transferred and latched into the F-latch after which it can be transferred to a location in the buffer 22.

Thus, in Automatic Read operations the combination of clock signals from the tape control unit $50_{tc}$ and the 8-megahertz basic clock signals will combine synchronously to enable the transfer of data from the magnetic tape unit to the RAM buffer 22 of the peripheral-controller.

Referring to FIG. 5C, there is seen a tabular scheme chart which indicates the relationships of the logic signals from logic unit 154, the input flag signals to the logic unit 154 and the status of the input latches for the E-latch $51_e$ and for the F-latch $51_f$.

As seen in FIG. 5C, when the E-latch and the F-latch are both "empty", then the output line EFEMPTY is active while the other two output lines of logic unit 154 are inactive.

When the E-latch is "empty" and the F-latch is "full", then the output logic line EFEMPTY is "inactive" while the other two lines (TCU flag A and EEMPTY) are both "active".

When both the E-latch and F-latch are full (that is to say, when each of them has a single word being held within it), then it will be seen that the TCUFLGA line is "active" while both the other two lines are "inactive".

If there should be an "error" because the latches are both full (and thus some data may have been lost in transmission), then all three output lines of the logic unit 154 will be "inactive" in order to indicate the error status.

As seen in FIG. 7 and in further clarification of FIG. 5A, the TCU clock is connected to the JK flip-flop 142 which provides the output signal INFLAG. This signal is ANDed with the SEND/ signal to provide the signal EFLATEN.

This signal (EFLATEN) means that the Read operation and the receipt of the data strobe (clock) from the tape control unit peripheral will put data into the E or F latch.

Thus, the peripheral-controller $20_t$ provides capability for an automatic Read system whereby a peripheral tape control unit will send synchronization clocking signals which are combined with the basic 8-megahertz clock signals of the system in order to regulate the movement of individual words from a magnetic tape unit over to an "E-latch" and thence to an "F-latch" for transfer to the RAM buffer 22 for temporary storage. The circuitry of FIG. 5B will be seen to provide sensitivity to the conditions of the E-latch and the F-latch so that data transferred can be regulated as long as one of the latches (E-latch and F-latch) is empty and capable of accepting data; and further the circuit of FIG. 5B will indicate when these latches are full which would lead to an error condition whereby data transfer might be lost because the latches were both filled up.

The peripheral-controller described herein permits data transfers from magnetic tape peripherals to temporary buffer memory storage in the controller in an orderly synchronized fashion partially regulated by the peripheral, and partially by the Automatic Read Logic circuitry.

While the specific embodiment described indicates the accomplishment of these functions, other embodiments may also be used to accomplish the cohcept of the invention which is delineated in the attached claims.

What is claimed is:

1. In a network wherein a peripheral controller can request connection to and service from a main host computer and wherein data is transferred between a main host computer and a magnetic tape peripheral unit via a peripheral-controller, wherein said peripheral-controller is initiated by commands from said host computer to execute data transfer operations and said peripheral-controller includes a common control circuit unit for sequencing microcode instructions and a peripheral dependent circuit unit for managing said tape peripheral unit, said peripheral dependent circuit unit having its own internal basic clock unit, an automatic read-logic system for transfer of data from said tape peripheral unit to a buffer memory means for later transfer to said host computer without requiring continuous instructions from said common control circuit unit, said automatic read-logic system comprising:
  (a) a block organized buffer memory means in said peripheral-controller for temporarily storing blocks of data-words being transferred from said tape peripheral unit, said buffer memory means providing N blocks of memory space, and having channels of connection to said tape peripheral unit and said host computer;
  (b) automatic selection and control means, activated by said common control circuit unit, for enabling an automatic read-logic unit;
  (c) said automatic read-logic unit, when enabled, functioning to transfer blocks of data-words from said tape peripheral unit to said buffer memory means without further instructions from said common control cirouit unit;
  (d) status sensing means for sensing the number "X" of blocks of data residing in said buffer memory means and including:
    (d1) signal output means connected to said common control circuit unit for generating status signals indicating the number "X" of data blocks occupied;
  (e) said common control circuit unit functioning to select operating routines according to said status signals received during Read operations, and including:
    (e1) means to generate a service-connection request to said main host computer when said status signals indicate that a portion "n", of the N blocks, are full, where "n" may be a fraction such as $\frac{1}{4}, \frac{1}{3}, \frac{1}{2}$.

2. The automatic read-logic system of claim 1 which includes:
  (a) a tape control unit connecting a plurality of magnetic tape peripheral units to said peripheral dependent circuit unit and wherein said tape control unit provides synchronizing signals to said automatic read-logic unit for clocking the transfer of data to said buffer memory means.

3. The automatic read-logic system of claim 2, wherein said peripheral-dependent circuit unit includes:
  (a) first and second latch registers for receiving data from said tape control unit for transfer to said buffer memory, said latch registers operating under the control latching logic means located in said automatic read-logic unit.

4. The automatic read-logic system of claim 3, wherein said automatic read-logic unit includes:
  (a) latching logic means, connected to said first and second latch registers, for regulating the receipt of, and output of, bytes of data being transferred to said buffer memory means.

5. The system of claim 4, wherein said automatic read-logic unit includes:
  (a) a flag logic circuit connected to receive clock signals from a synchronization logic means and functioning to develop information signals for said latching logic means; and
wherein said peripheral dependent circuit unit includes:
  (b) synchronization logic means regulated by clock signals from said tape control unit for enabling said latching logic means to transfer data from said tape control unit through said first and second latch registers to said buffer memory means.

6. In a network wherein data is transferred between a main host computer and a magnetic tape peripheral unit via a peripheral-controller, wherein said peripheral-controller is initiated by commands from said host computer to execute data transfer operations and said peripheral-controller includes a common control circuit unit for sequencing microcode instructions and a peripheral dependent circuit unit for managing said tape peripheral unit, said peripheral dependent circuit unit having its own internal basic clock unit, an automatic read-logic system for transfer of data from said tape peripheral unit to a buffer memory means for later transfer to said host computer without requiring continuous instructions from said common control circuit unit, said automatic read-logic system comprising:
  (a) buffer memory means, in said peripheral-controller, organized for temporarily storing blocks of data-words being transferred from said tape peripheral unit, said buffer memory means providing N blocks of memory space, and having channels of connection to said tape peripheral unit and said host computer;
  (b) automatic selection and control means, activated by said common control circuit unit, for enabling an automatic read-logic unit;
  (c) a tape control unit connecting a plurality of magnetic tape peripheral units to said peripheral dependent circuit unit and wherein said tape control unit provides sychronizing signals to said peripheral dependent circuit for the transfer of data-words to said buffer memory means;
  (d) said automatic read-logic unit functioning, when enabled by said automatic selection and control means, to operate latch register means which provide a data transfer channel from said tape control unit to said buffer memory means, said automatic read-logic unit operating to transfer blocks of datawords from said tape control unit to said buffer memory means until said common control circuit disables said automatic read logic unit;

(e) status sensing means for sensing the number "X" of blocks of data residing in said buffer memory means and including:

(e1) signal output means connected to said common control circuit unit for generating status signals indicating the number "X" of data blocks occupied, where X is a whole number;

(f) said common control circuit unit functioning to select operating routines according to said status signals received during Read operations, and including:

(f1) means to disable said automatic read-logic unit when said status signals indicate that "N−1" blocks are occupied in said buffer memory means.

7. The system of claim 6, wherein said latch register means includes:

(a) a first latch register for receiving data from said tape control unit and for transferring data to a second latch register;

(b) a second latch register, for receiving data from said first latch register, and connected to place data into said buffer memory means.

* * * * *